(12) United States Patent
Hashimoto et al.

(10) Patent No.: US 7,490,143 B2
(45) Date of Patent: Feb. 10, 2009

(54) COMMUNICATION SYSTEM

(75) Inventors: Minoru Hashimoto, Tokyo (JP);
Toyoshi Okada, Tokyo (JP)

(73) Assignee: Sony Computer Entertainment Inc. (JP)

( * ) Notice: Subject to any disclaimer, the term of this patent is extended or adjusted under 35 U.S.C. 154(b) by 576 days.

(21) Appl. No.: 10/079,708

(22) Filed: Feb. 20, 2002

(65) Prior Publication Data
US 2002/0156843 A1 Oct. 24, 2002

(30) Foreign Application Priority Data
Feb. 20, 2001 (JP) ............................ P2001-044228
Feb. 13, 2002 (JP) ............................ P2002-034870

(51) Int. Cl.
*G06F 15/16* (2006.01)
(52) U.S. Cl. ...................................... 709/223; 709/204
(58) Field of Classification Search ................ 709/203, 709/201, 200, 223, 204
See application file for complete search history.

(56) References Cited
U.S. PATENT DOCUMENTS 5,671,354 A * 9/1997 Ito et al. ..................... 713/201
5,805,203 A * 9/1998 Horton ........................ 725/119
6,993,358 B2 * 1/2006 Shiotsu et al. ............ 455/552.1

FOREIGN PATENT DOCUMENTS

| JP | 06-019926 A1 | 1/1994 |
| JP | 9081485 A | 3/1997 |
| JP | 2000-047957 A1 | 2/2000 |

OTHER PUBLICATIONS

Kanaya, G., Network Meeting, Ascii (Monthly), PC, Japan, ASCII Corporation, Feb. 1, 1999, vol. 2, No. 2, pp. 110-113.

* cited by examiner

*Primary Examiner*—Jason Cardone
*Assistant Examiner*—Adnan M Mirza
(74) *Attorney, Agent, or Firm*—Lerner, David, Littenberg, Krumholz & Mentlik, LLP

(57) ABSTRACT

When a user designates a communication application, a communication server machine searches a database for another user who can have a communication with the former user through the communication application designated by the former user, and then connects the users with each other through the designated communication application. As a result, the users can have an optimum smooth communication.

20 Claims, 5 Drawing Sheets

COMMUNICATION SYSTEM

CROSS-REFERENCE TO RELATED APPLICATIONS

This application claims priority from Japanese Patent Application Nos. 2001-44228 filed on Feb. 20, 2001, and 2002-034870 filed on Feb. 13, 2002, the disclosures of which are hereby incorporated by reference herein.

BACKGROUND OF THE INVENTION

The present invention relates to communication systems and communication methods in which users having different connection environments are connected with each other through the optimum communication means automatically selected so as to make the optimum smooth communication, and also to terminal devices, computer programs for communication, and computer-readable recording media having the communication programs recorded thereon.

In recent years, with the progress of communication techniques, communication lines having various transmission bands have been developed and put in practical use. For example, well known are an ISDN (Integrated Services Digital Network) line with its transmission rate of 128 kbps, a T1 line with its transmission rate of 1.544 Mbps, an ADSL (Asymmetric Digital Subscriber Line) with its up transmission rate of 16 kbps to 1 Mbps and its down transmission rate of 1.5 to 8 Mbps, and a cable television (CATV) communication line with its transmission rate of 512 kbps. Using one of such communication lines, each user connects his or her client terminal device with an Internet service provider (ISP) or the like to receive desired services or provide predetermined services.

On the other hand, as communication means capable of making a one-to-one communication between persons or communications among several persons on a network, there are a text chat system for which even a connection environment of a transmission band with a transmission rate of about 56 kbps suffices, an Internet telephone system using VOIP (Voice Over IP), a video chat system and a voice chat system that require a connection environment of a transmission band with a transmission rate of about 128 kbps, TV conference systems that require a connection environment of a transmission band with a transmission rate of about 512 kbps, and so on.

In general, users have different connection environments as described above. In addition, it is difficult for users who intend to have communications with each other to know the connection environments of the opposite parties. Thus, there is a conventional problem that such users cannot select the optimum communication means for their communication.

For example, in a case in which the users each have a connection environment of a high-speed communication line such as the T1 line or the like described above, they need not communicate through the text chat system that uses a narrow band communication line. They can communicate through the video chat system or the like that requires a communication line of a broader transmission band than the text chat system. If they nevertheless adopted communication means for a narrow band communication line, it means that their valuable high-speed communication line was not being utilized effectively and it never means that they had a fully smooth communication.

SUMMARY OF THE INVENTION

The present invention has been made in consideration of the above-mentioned problem. A communication system, a communication method, terminal devices, a computer program for communication, and a computer-readable recording medium having recorded thereon the computer program for communication are provided, wherein the optimum communication means for the connection environments of users who intend to communicate with each other is automatically selected to connect between the users and thereby the users can have the optimum communication without special effort.

According to the present invention, the user levels based on at least the connection environments of client terminal devices connected to a predetermined network are managed with unique identification numbers assigned to the respective client terminal devices. When a communication server machine connected to the network is requested by a user to start a communication with another user, the communication server machine selects a communication application that meets both the user level of the user who has requested the communication and the user level of the opposite party to the communication. The communication server machine then makes a connection between the users through the selected communication application.

In this manner, the users can communicate through a communication application automatically selected so as to meet their connection environments.

DETAILED DESCRIPTION

Figure 1:
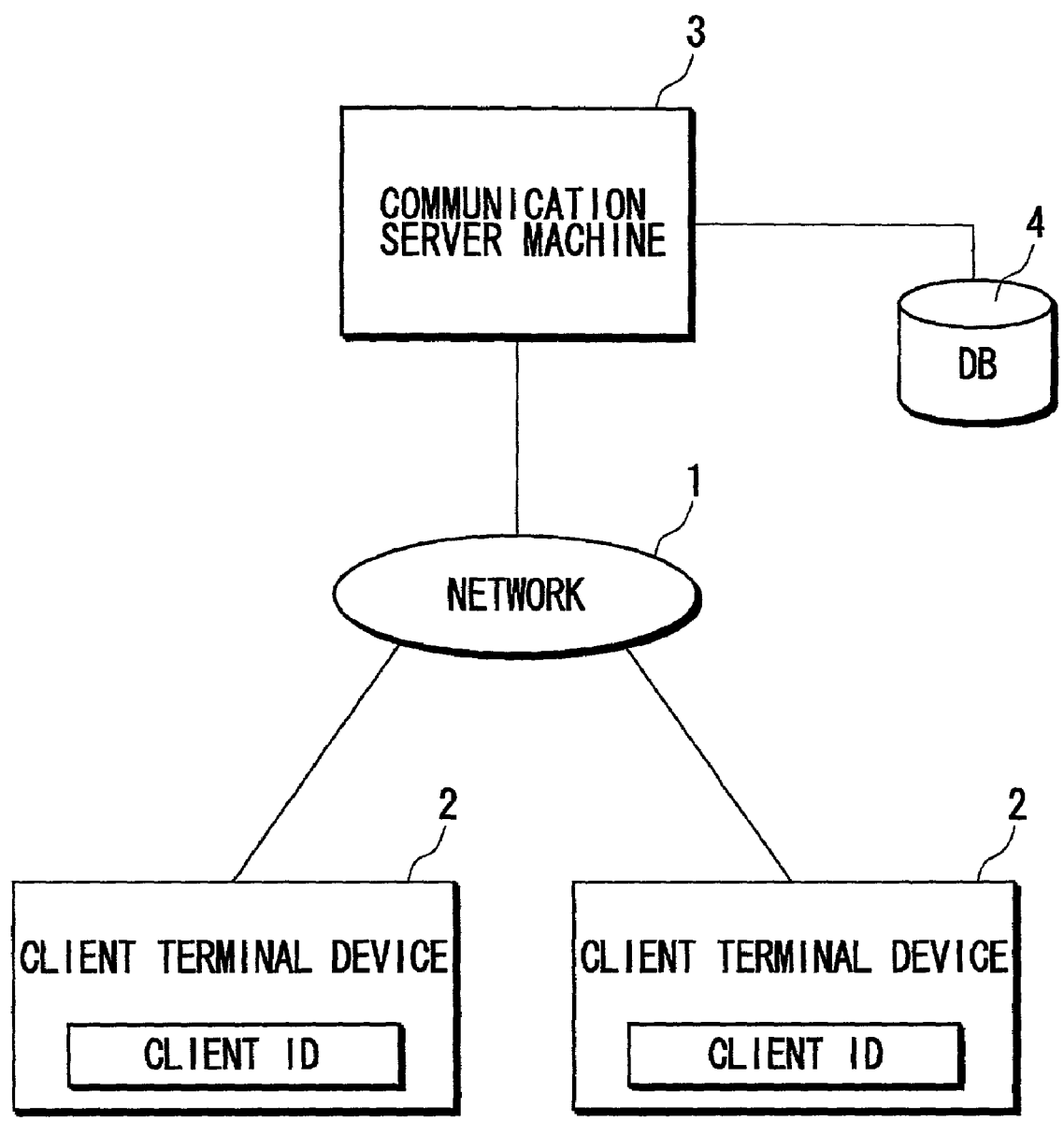
FIG. 1 is a block diagram of a communication system according to the first embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

First Embodiment

The present invention is applicable to a communication system in which a communication server machine connected to a predetermined network manages the service levels of all users together.

Construction of First Embodiment

FIG. 1 is a block diagram of a communication system according to the first embodiment of the present invention. Referring to FIG. 1, the communication system of this embodiment includes client terminal devices 2 of users connected to a predetermined network 1, such as the Internet, and a communication server machine 3 for communication management connected to the network 1.

Each client terminal device 2 is assigned a client ID as an identification number unique to the device. Each user uses the client ID of his or her client terminal device 2 for making a user registration to the communication server machine 3. The user registration may include information on his or her connection environment and so on.

The communication server machine 3 includes a database (DB) 4 for storing data of each user, such as the client ID, connection environment, etc., together with the user ID of the user.

Besides, the database 4 stores therein communication applications for, e.g., a text chat system, a video chat system, a voice chat system, and a TV conference system.

Operation of First Embodiment

The communication server machine 3 of the communication system of this embodiment selects out of the database 4 the optimum communication application for the connection environments of users who intend to have a communication with each other. The communication server machine 3 then connects the client terminal devices 2 of the users with each other through the selected optimum communication application.

User Registration

Any user who intends to use this communication system must first register with the communication server machine 3.

The user who is to register connects his or her client terminal device 2 with the communication server machine 3 through the network 1 illustrated in FIG. 1. The user then inputs predetermined data to his or her client terminal device 2. The data to be input may contain, e.g.:
1. "handle name" that the user likes to use;
2. "communication level" indicating the connection environment of the user, e.g., 64 kbps, 1 Mbps, or the like;
3. "usable peripherals (peripheral devices)" that the user can use for communication, e.g., a microphone set, a camera system, or the like;
4. "communication permission level" indicating a desired connection environment for communication, e.g., "I want to have a communication only with users having a connection environment of a transmission band of 64 kbps."; and
5. "IP (Internet Protocol) address" of the user.

After inputting the data, the user operates his or her client terminal device 2 to transmit the data.

The above-described "communication permission level" is not always required to correspond to the user's own connection environment. For example, a user who has a connection environment of a transmission band of 64 kbps can designate another transmission band of, e.g., 1 Mbps as his or her "communication permission level" if he or she desires to do so. In such a case, however, since the user may communicate with a user having a connection environment superior to that of the former user, when using, e.g., the video chat system for the communication, the former user cannot help but sustain a little inconvenience in the communication, e.g., skips in video images, because of the lack of the transmission band.

The client terminal device 2 used by the user to transmit the data reads out the client ID from a semiconductor memory such as a mask ROM in the device. The device adds the client ID to the data input by the user and then transmits the total data to the communication server machine 3.

The communication server machine 3 that receives the data from the user makes a user ID for the user and then transmits the user ID to the client terminal device 2 of the user. In addition, the communication server machine 3 registers in the database 4 the data received from the user, such as "handle name", "communication level", "usable peripherals", "communication permission level", and "IP address", as user data, together with the user ID of the user.

Procedure for Using Communication System

When the user registration has been completed as described above, the user is allowed to use the communication system.

Figure 2:
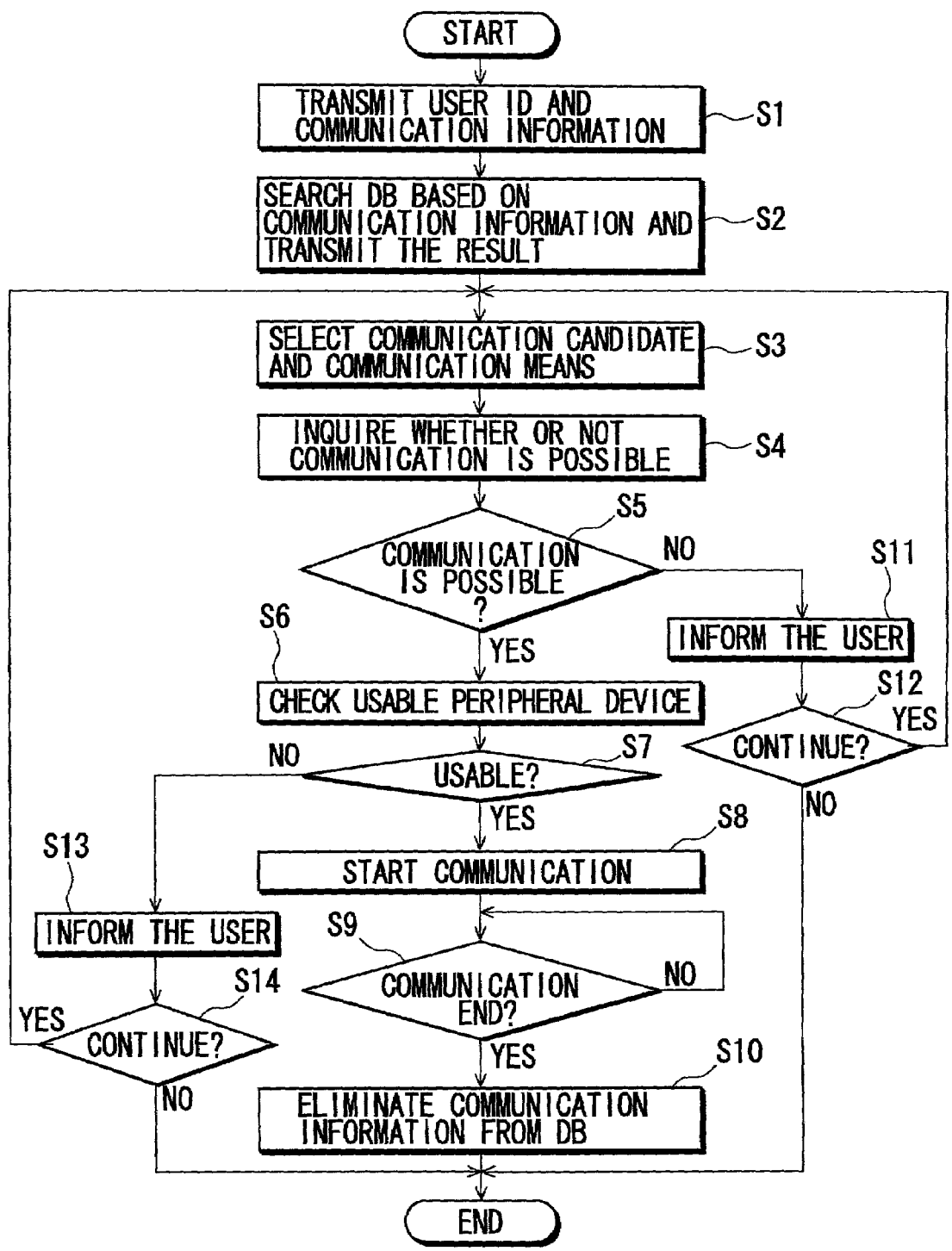
FIG. 2 is a flowchart of a procedure for using the communication system according to the first embodiment.

FIG. 2 is a flowchart of a procedure for using the communication system. The flow of FIG. 2 starts when a user who intends to have a communication with another user or users connects his or her client terminal device 2 to the communication server machine 3. The flow then advances to step S1.

In step S1, the user operates his or her client terminal device 2 to input communication information for specifying another user as the opposite party to the communication, e.g., "a user having a connection environment of 1 Mbps or more". The user then operates the client terminal device 2 to transmit the communication information.

The client terminal device 2 that has been operated to transmit the communication information adds the user ID input by the user and the client ID to the communication information. The client terminal device 2 then transmits to the communication server machine 3 the total information as the communication information. The flow then advances to step S2.

In step S2, the communication server machine 3 temporarily stores in the database 4 the communication information received from the client terminal device 2 of the user. In addition, the communication server machine 3 refers to the database 4 with the user and client IDs received, and reads out "communication permission level" of the user from the registered user data of the user. On the basis of the "communication permission level" of the user, the communication server machine 3 searches the database 4 for other users that meet the "communication permission level". The communication server machine 3 then makes a communication candidate list composed of, e.g., the IP addresses of searched-out users. Also, the communication server machine 3 creates a selection window for the user who has requested to have a communication with the communication candidate to select a communication application to be used for the communication. After this, the communication server machine 3 transmits the communication candidate list and the communication application selection window to the client terminal device 2 of the user.

The client terminal device 2 that receives the communication candidate list and the communication application selection window displays the communication candidate list and the communication application selection window on a monitor device connected with the client terminal device 2. The flow then advances to step S3.

In step S3, the user of the client terminal device 2 selects one or more communication candidates out of the communication candidate list displayed on the monitor device. Additionally, the user selects a communication application to be used for the communication with the selected communication candidates.

Figure 3:
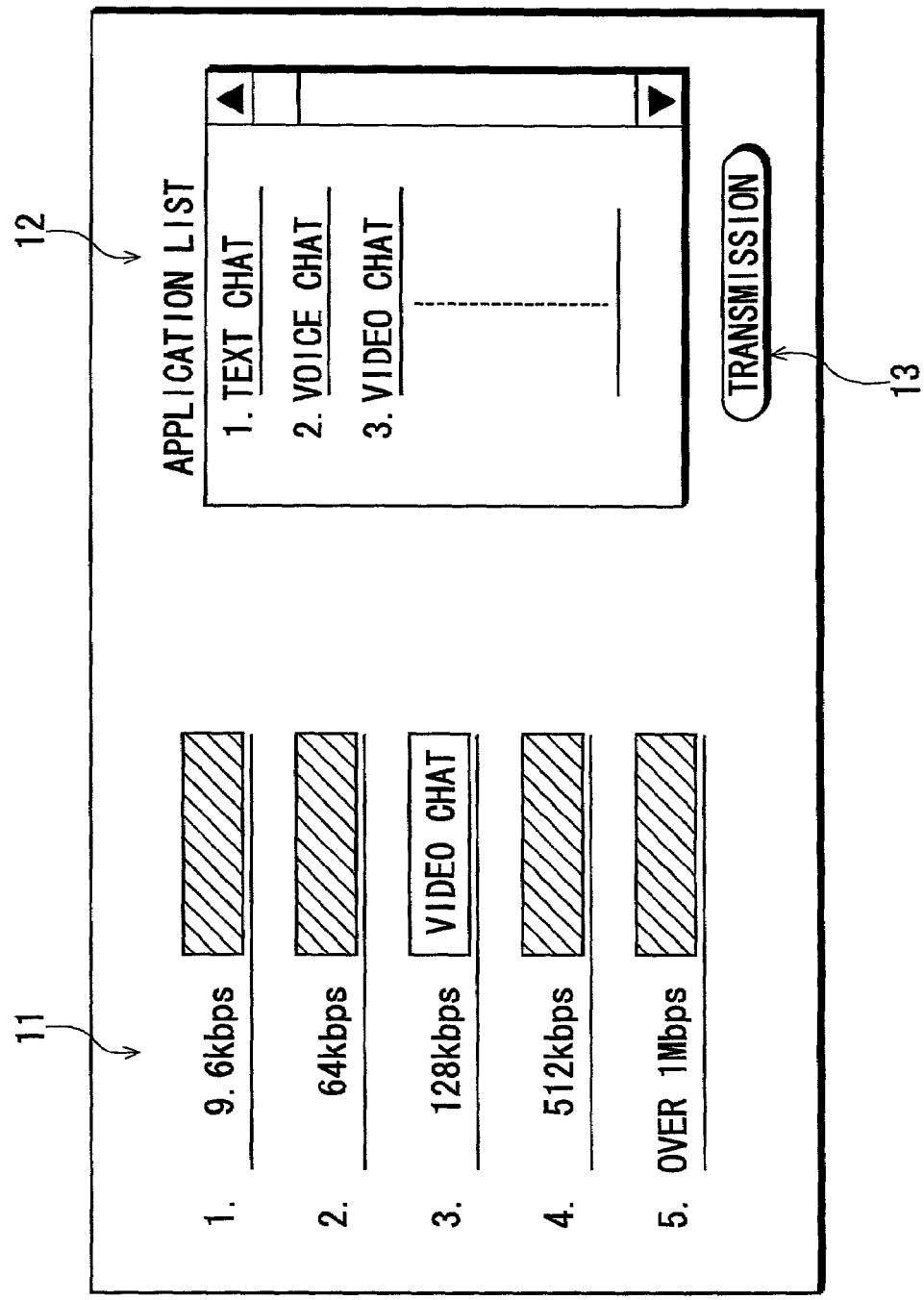
FIG. 3 is a view showing an example of a window for selecting a transmission band to be used and a communication application to be used in the communication system according to the first embodiment.

This will be described more specifically with reference to FIG. 3, which illustrates an example of the communication application selection window displayed on the monitor device. Referring to FIG. 3, the communication application selection window includes a transmission band selection area 11 for selecting a transmission band out of, e.g., 9.6 kbps, 64 kbps, 128 kbps, and so on; an application selection area 12 for selecting a communication application out of, e.g., a text chat system, a voice chat system, a video chat system, a TV conference system, and so on; and a transmission button 13 for determining the transmission of selected communication data.

In the example of FIG. 3, the user first selects a communication application out of the application selection area 12 and then selects a transmission band out of the transmission band selection area 11.

For example, if the user is to select the video chat system as a communication application, he or she operates an input device such as a mouse or keyboard to move a cursor on the screen onto the display position of "video chat" in the application selection window 12, and selects the video chat system by, e.g., clicking the mouse. The letters (or image) of the communication application selected by the user may be changed in, e.g., display color, to indicate to the user that the communication application has been selected.

Next, if the user is to select a transmission band of 128 kbps, like the above operation, he or she operates the input device to move the cursor on the screen onto the display position of "128 kbps" in the transmission band selection area 11, and selects the transmission band of 128 kbps by, e.g., clicking the mouse.

When the selection of the transmission band has been completed, the letters of the communication application selected in advance are displayed in line with the letters of the selected transmission band. In the example of FIG. 3, since the video chat system has been selected as a communication application, the letters "video chat" are displayed in line with the letters "128 kbps" of the selected transmission band. Thus, the user can easily recognize the selected communication application.

Next, the user who has selected the communication candidates and the communication application as described above operates the input device to move the cursor onto the transmission button 13 illustrated in FIG. 3, and then depresses the transmission button 13 by, e.g., clicking the mouse.

When the transmission button 13 is depressed, the client terminal device 2 transmits to the communication server machine 3 information on the communication candidates and communication application selected by the user, together with the user ID of the user and the client ID of the client terminal device 2 of the user. The flow of FIG. 2 then advances to step S4.

In step S4, the communication server machine 3 communicates with the client terminal device 2 of each communication candidate selected by the user, and inquires of the communication candidate whether a communication is possible using the communication application selected by the user.

Each communication candidate that has received this inquiry replies to the communication server machine 3 whether a communication is possible using the communication application selected by the user. In step S5, the communication server machine 3 determines by the reply from the communication candidate whether communication with the communication candidate is possible using the communication application selected by the user. If communication is possible, the flow advances to step S6. If communication is impossible, the flow advances to step S11.

In step S11, since the communication candidate selected by the user cannot communicate with the user through the communication application selected by the user, the communication server machine 3 transmits to the client terminal device 2 of the user a message urging the user to select another communication application, e.g., "Please select another communication application."

If the user is to select another communication application following the message, he or she informs the communication server machine 3 of that effect in step S12. In one case, the communication server machine 3 determines that the user has an intention of continuing the communication, so the flow returns to step S3 in which the user selects another communication application.

In contrast, if the user is not to select another communication application, the flow ends midway because time is over or because the user has given instructions to end the use of this communication system in step S12.

When the communication server machine 3 receives in step S5 a reply from the communication candidate that communication is possible using the communication application selected by the user, the flow advances to step S6 in which the communication server machine 3 searches the database 4 for the user data of the user and checks peripheral devices that the user will use for the communication. The communication server machine 3 then transmits information on the user's peripheral devices to the client terminal device 2 of the communication candidate so that the communication candidate may check his or her own peripheral devices.

More specifically, for example, in the case that the video chat system has been selected as a communication application, both users who intend to communicate through the video chat system must have a microphone set and a camera system. In this example, therefore, the communication server machine 3 informs the communication candidate of the information (the user's peripheral information) that states that a microphone set and a camera system are to be used by the user, so that the peripheral devices to be used by each other can be checked.

After checking, the communication candidate replies through his or her client terminal device 2 to the communication server machine 3 whether he or she can communicate using the same kinds of peripheral devices as those of the user. In step S7, the communication server machine 3 determines by the reply from the communication candidate whether the communication candidate can communicate using the same peripheral devices as the user.

If the communication server machine 3 receives a reply that the communication candidate can communicate using the same peripheral devices as the user, the flow advances to step S8. If the communication server machine 3 receives a reply to the contrary, the flow advances to step S13.

In the case that the communication server machine 3 receives a reply that the communication candidate cannot communicate using the same peripheral devices as the user, the communication candidate cannot communicate with the user through the communication application selected by the user. Therefore, in step S13, the communication server machine 3 transmits to the client terminal device 2 of the user a message urging the user to select another communication application, e.g., "Please select another communication application."

If the user is to select another communication application following the message, he or she informs the communication server machine 3 of that effect in step S14. In one case, the communication server machine 3 determines that the user has an intention of continuing the communication, so the flow returns to step S3 in which the user selects another communication application.

In contrast, if the user is not to select another communication application, the flow ends midway because time is over or because the user has given instructions to end the use of this communication system in step S14.

When the communication server machine 3 receives in step S7 a reply from the communication candidate that communication is possible using the same peripheral devices as the user, the conditions for communicating between the user and the communication candidate become complete. Thus, in step S8, the communication server machine 3 reads out of the database 4 the communication application designated by the user, and connects the client terminal device 2 of the user with that of the communication candidate through the communication application. The user and the communication candidate thereby can communicate with each other through the communication application, e.g., "video chat".

During the communication between the user and the communication candidate, the communication server machine 3 always checks in step S9 as to whether the user or the communication candidate has given an instruction to end the communication. When such an instruction to end the communication is given, the flow advances to step S10 in which the communication server machine 3 eliminates the communication information that has been temporarily stored in the database 4. The flow then ends.

In another example, the communication information that was temporarily stored in the database 4 when the user accessed the communication server machine 3 may not be eliminated. In this example, since the communication information is kept, the user will be able to repeatedly communicate with the same communication candidate under the same communication conditions. However, since the communication server machine 3 is accessed by many users in general, storing communication information on every user may require a greater part of the capacity of the database 4. It is therefore preferable to eliminate communication information on each user when the communication of the user ends.

As described above, according to the communication system of this first embodiment, the communication server machine 3 searches for communication candidates with whom a user can communicate through a communication application selected by the user. The communication server machine 3 then connects the user through the communication application with each communication candidate selected. Thus, users can have a smooth communication with each other through the optimum communication application that meets the connection environments of the users.

Second Embodiment

Next, a communication system according to the second embodiment of the present invention will be described. In the above-described first embodiment, the communication server machine 3 manages the service levels of all users together. In contrast, in this second embodiment, each user manages the service levels of users with his or her client terminal device.

The second embodiment differs from the first embodiment only in this feature, so only the different feature will be described to avoid repetitious description.

Construction of Second Embodiment

Figure 4:
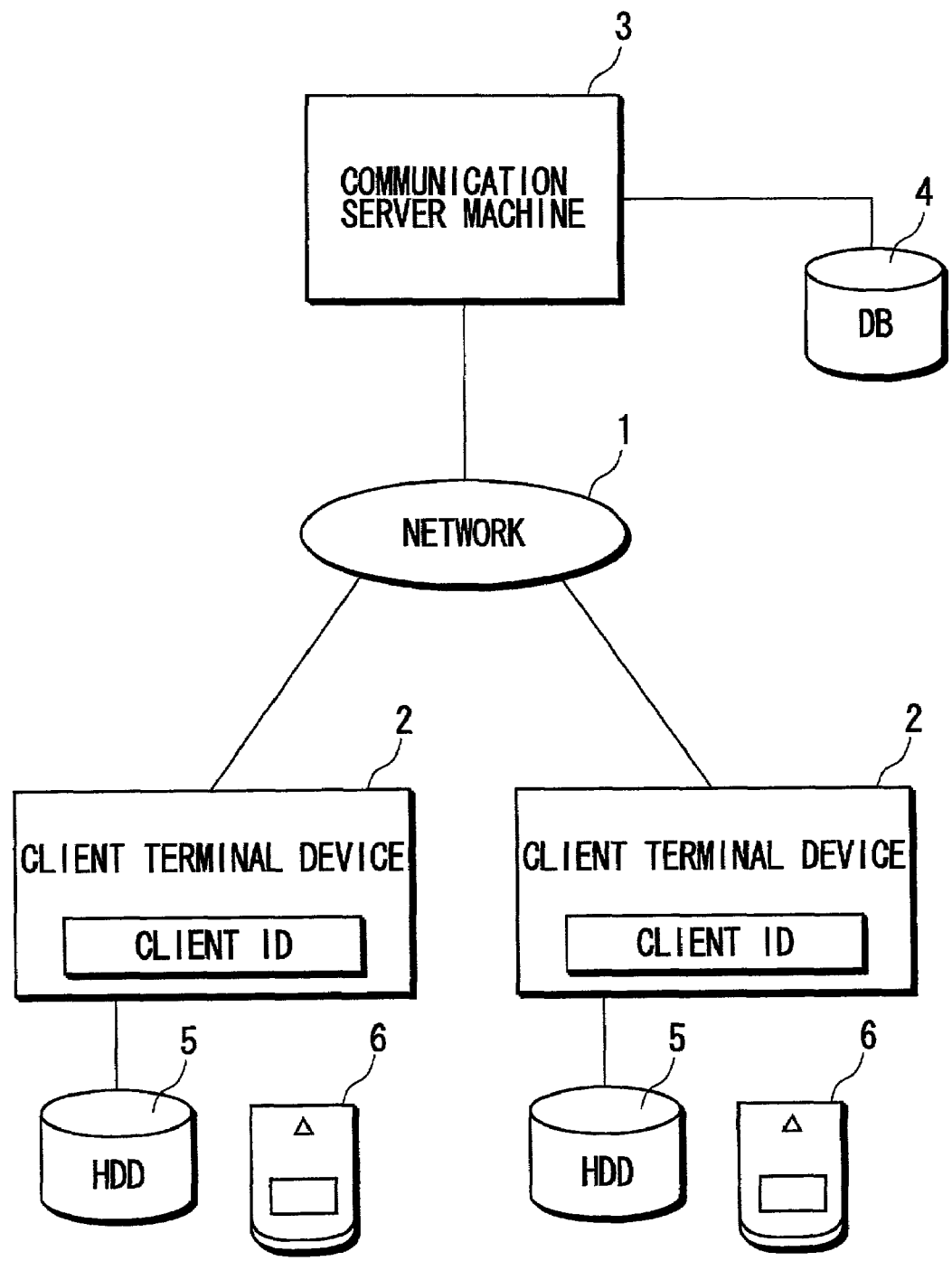
FIG. 4 is a block diagram of a communication system according to the second embodiment of the present invention.

FIG. 4 is a block diagram of a communication system according to the second embodiment of the present invention. Referring to FIG. 4, in the communication system of this second embodiment, each client terminal device 2 is provided with a memory device such as a hard disk drive (HDD) 5 or a memory card 6 made of a semiconductor memory. The memory device stores therein communication applications for different connection environments, a connection opposite party list, and so on.

More specifically, in the communication system of this second embodiment, when client terminal devices 2 communicate with each other, they exchange with each other information on "handle name", "communication level", "usable peripheral", "communication permission level", "transmission band", "client ID", "IP address", etc. Each client terminal device 2 stores in its memory device such information obtained. Thus, in the connection opposite party list stored in the memory device, new such information is accumulated each time the user communicates with a new opposite party.

In another example, each user may transmit information on his or her connection environment, usable peripheral, and so on, to the communication server machine 3 to make a connection opposite party list in the database 4. In this example, a user who intends to have a communication accesses the communication server machine 3 to download the connection opposite party list from the database 4.

Operation of Second Embodiment

Once such a connection opposite party list is made in the memory device of the client terminal device 2 of a user, only by selecting an opposite party out of the connection opposite party list can the user communicate with the opposite party through the optimum communication application automatically selected.

Figure 5:
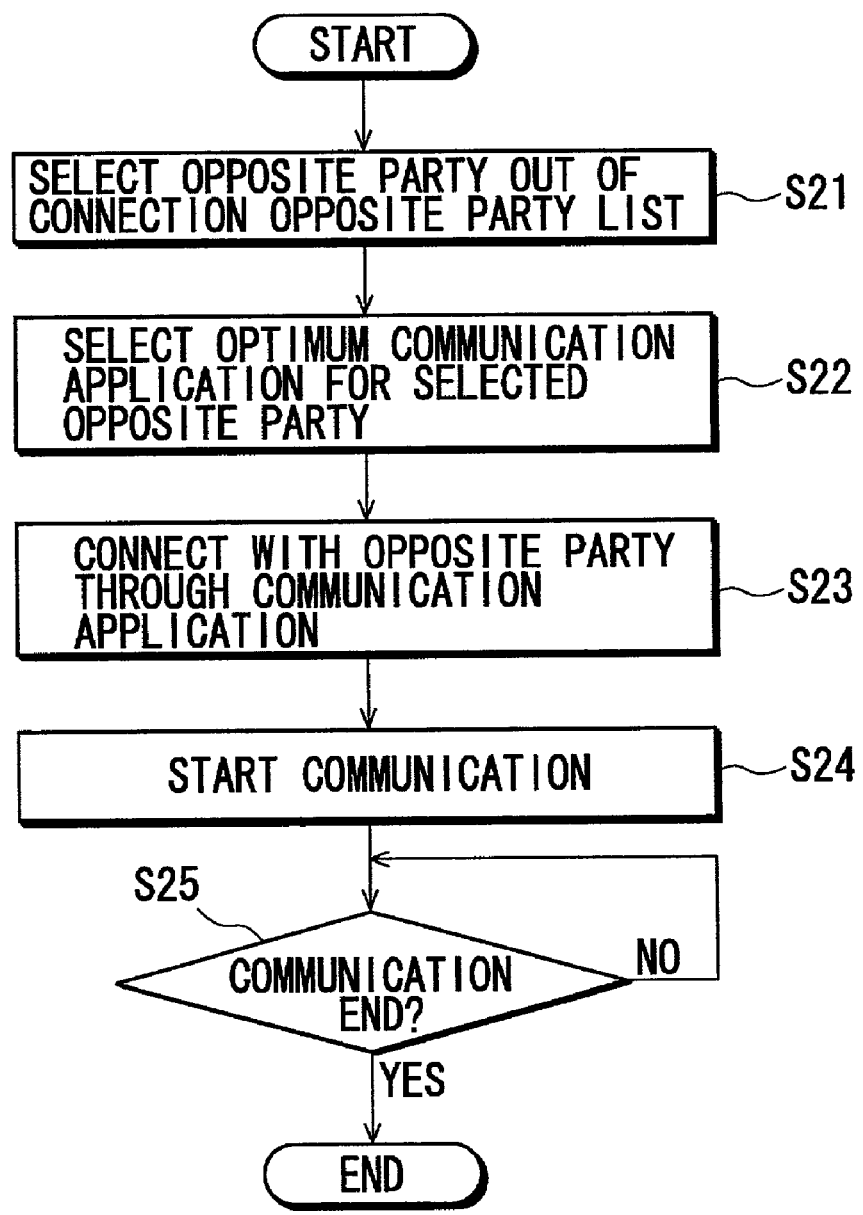
FIG. 5 is a flowchart of a procedure for using the communication system according to the second embodiment.

FIG. 5 is a flowchart of a procedure for using the communication system of this second embodiment. The flow of FIG. 5 starts when a user who has made such a connection opposite party list in the external memory device connected to his or her client terminal device 2 and intends to communicate with another user or users in the list turns on the power to his or her client terminal device 2. The flow then advances to step S21.

In step S21, the user operates his or her client terminal device 2 to read out the connection opposite party list from the memory device, and then selects an opposite party out of the list. The flow then advances to step S22.

As described above, the connection opposite party list contains therein not only information on the IP address of each opposite party but also information on the connection environment, usable peripherals, and so on of each opposite party. Thus, in step S22, on the basis of information on the connection environment, usable peripherals, and so on of the opposite party selected by the user, the client terminal device 2 reads out the optimum communication application from the memory device and activates the application.

More specifically, in the case that the user has a connection environment of, e.g., a T1 line and the opposite party has a connection environment of, e.g., a band-assurance DSL of 128 kbps, the use of, e.g., a text chat system for which a transmission band of 9.6 kbps suffices would not achieve a full use of their connection environments, and a high-resolution TV telephone system that requires a transmission band of 512 kbps can not be used. In this case, therefore, the client terminal device 2 selects a communication application of, e.g., an IP telephone system that requires a transmission band of 128 kbps.

In step S23, the client terminal device 2 makes connection through the activated communication application with the opposite party selected by the user. By this, in step S24, the user can have a smooth communication with the opposite party through the optimum communication application.

During the communication between the user and the opposite party, the communication server machine 3 always checks in step S25 as to whether the user or the opposite party has given an instruction to end the communication. When detecting such an instruction, the communication server machine 3 makes the communication end. The flow of FIG. 5 then ends.

As described above, according to the communication system of this second embodiment, the client terminal device 2 of each user makes a connection opposite party list by accumulating information on connection environment and so on of each opposite party with whom the user had a communication. After this, when the user selects an opposite party out of the connection opposite party list, the client terminal device 2 of the user reads out from the memory device the optimum communication application for both the user and the opposite party considering their connection environments. The client terminal device 2 then activates the communication application to connect between the user and the opposite party.

In this manner, like the above-described first embodiment, the user can have a smooth communication with the opposite party.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A communication system, comprising:
a plurality of client terminal devices connected to a network and respectively associated with a plurality of identification numbers such that a given one of said plurality of client terminal devices is assigned to a unique one of the plurality of identification numbers; and
a communication server machine connected to the network and operable to manage, for each one of said plurality of client terminal devices, the unique identification number assigned to that client terminal device and user information specific to a user of that client terminal device which indicates at least conditions under which that client terminal device may be connected to the network, the conditions including at least one transmission rate available to that client terminal device and a type of peripheral device associated with that client terminal device, and
in response to a user of a first one of said plurality of client terminal devices requesting communication using a selected communication application with a user of a second one of said plurality of client terminal devices, said communication server machine being further operable (i) to determine whether the selected communication application is suitable for communication between the first client terminal device and the second client terminal device based on first user information specific to the user of the first client terminal device and second user information specific to the user of the second client terminal device, (ii) if the selected communication application is suitable, to determine whether the type of peripheral device associated with the first client terminal device can communicate with the type of peripheral device associated with the second client terminal device based on the first user information and the second user information, the type of peripheral device including at least one of a microphone or a camera, and (iii) if the type of peripheral device associated with the first client terminal device can communicate with the type of peripheral device associated with the second client terminal device, to provide a connection for communication between the first client terminal device using its associated peripheral device and the second client terminal device using its associated peripheral device.

2. In a communication server machine connected to a network and to a plurality of client terminal devices respectively associated with a plurality of identification numbers such that a given one of the plurality of client terminal devices is assigned to a unique one of the plurality of identification numbers, a communication method, comprising:
managing, for each one of the plurality of client terminal devices, the unique identification number assigned to that client terminal device and user information specific to a user of that client terminal device which indicates at least conditions under which that client terminal device may be connected to the network, the conditions including at least one transmission rate available to that client terminal device and a type of peripheral device associated with that client terminal device; and
in response to a user of a first one of said plurality of client terminal devices requesting communication using a selected communication application with a user of a second one of said plurality of client terminal devices,
determining whether the selected communication application is suitable for communication between the first client terminal device and the second client terminal device based on first user information specific to the user of the first client terminal device and second user information specific to the user of the second client terminal device,
if the selected communication application is suitable, determining whether the type of peripheral device associated with the first client terminal device can communicate with the type of peripheral device associated with the second client terminal device based on the first user information and the second user information, the type of peripheral device including at least one of a microphone or a camera, and
if the type of peripheral device associated with the first client terminal device can communicate with the type of peripheral device associated with the second client terminal device, providing a connection for communication between the first client terminal device using its associated peripheral device and the second client terminal device using its associated peripheral device.

3. A user terminal device connected over a network to a plurality of client terminal devices, each one of said user terminal device and the plurality of client terminal devices being respectively associated with a plurality of identification numbers such that a given one of said user terminal device and the plurality of client terminal devices is assigned a unique one of the plurality of identification numbers, said user terminal device comprising:
a list storage unit operable to store a list including, for each one of said user terminal device and the plurality of client terminal devices, the unique identification number assigned to that terminal device, an address of that terminal device, and conditions under which that terminal device may be connected to the network, the conditions including at least one transmission rate available to that terminal device and a type of peripheral device associated with that terminal device;
an application storage unit operable to store a plurality of communication applications; and a connection controller operable, in response to a user of said user terminal device requesting communication with a user of a particular one of said plurality of client terminal devices, (i) to locate in said application storage unit at least one of the plurality of communication applications that is suitable for communication between said user terminal device and the requested terminal device based on the conditions for connecting said user terminal device to the network and the conditions for connecting the requested terminal device to the network, (ii) to determine whether the type of peripheral device associated with said user terminal device can communicate with the type of peripheral device associated with the requested terminal device, the type of peripheral device including at least one of a microphone or a camera, and (ii) if the at least one suitable communication application is located and the type of peripheral device associated with said user terminal device can communicate with the type of peripheral device associated with the requested terminal device, to provide a connection for communication between said user terminal device using its associated peripheral device and the requested terminal device using its associated peripheral device.

4. The user terminal device according to claim 3, wherein the list is stored in the list storage unit after being downloaded from a communication server machine connected with the user terminal device through the network.

5. The user device according to claim 3, wherein at least one of the list storage unit and the application storage unit is selected from the group consisting of a hard disk drive and a memory card.

6. In a user terminal device connected over a network to a plurality of client terminal devices, each one of the user terminal device and the plurality of client terminal devices being respectively associated with a plurality of identification numbers such that a given one of the user terminal device and the plurality of client terminal devices is assigned with a unique one of the plurality of identification numbers, a communication method, comprising:

storing a list including, for each one of the user terminal device and the plurality of client terminal devices, the unique identification number assigned to that terminal device, the addresses of that terminal device, and conditions under which that terminal device may be connected to the network, the conditions including at least one transmission rate available to that terminal device and a type of peripheral device associated with that terminal device; and in response to a user of said user terminal device requesting communication with a user of a particular one of said plurality of client terminal devices, locating, from a plurality of stored communication applications, at least one of the plurality of communication applications that is suitable for communication between said user terminal device and the requested terminal device based on the conditions for connecting the user terminal device to the network and the conditions for connecting the requested terminal device to the network, determining whether the type of peripheral device associated with said user terminal device can communicate with the type of peripheral device associated with the requested terminal device, the type of peripheral device including at least one of a microphone or a camera; and if the at least one suitable communication application is located and the type of peripheral device associated with said user terminal device can communicate with the type of peripheral device associated with the requested terminal device, providing a connection for communication between the user terminal device using its associated peripheral device and the requested terminal device using its associated peripheral device.

7. The method according to claim 6, wherein the list is downloaded from a communication server machine connected to the network.

8. The method according to claim 6, wherein at least one of the list and the plurality of communication applications is stored in a storage unit selected from the group consisting of a hard disk drive and a memory card.

9. In a communication server machine connected to a network and to a plurality of client terminal devices respectively associated with a plurality of identification numbers such that a given one of the plurality of client terminal devices is assigned to a unique one of the plurality of identification numbers, a communication method, comprising:

receiving a request from a first user of a given one of the plurality of client terminal devices to start communication with a second user of another one of said plurality of client terminal devices;

searching a database for first user information specific to the first user using the unique identification number assigned to the given client terminal device, the first user information including at least conditions under which the given client terminal device may be connected to the network, the conditions including at least one transmission rate available to the given client terminal device and a type of peripheral device associated with the given client terminal device;

searching the database for second user information specific to the second user using the unique identification number assigned to the second client terminal device, the second user information including at least conditions under which the another client terminal device may be connected to the network, the conditions including at least one transmission rate available to the another client terminal device and a type of peripheral device associated with the another client terminal device;

searching for at least one of a plurality of communication applications that is suitable for both the given client terminal device and the another client terminal device based on the first user information and the second user information;

if the at least one suitable communication application is located, determining whether the type of peripheral device associated with the given client terminal device can communicate with the type of peripheral device associated with the another client terminal device based on the first user information and the second user information, the type of peripheral device including at least one of a microphone or a camera; and if the type of peripheral device associated with the given client terminal device can communicate with the type of peripheral device associated with the another client terminal device, providing a connection for communication between the given client terminal device using its associated peripheral device and the another client terminal device using its associated peripheral device.

10. In a user terminal device connected over a network to a plurality of client terminal devices, each one of the user terminal device and the plurality of client terminal devices being respectively associated with a plurality of identification numbers such that a given one of the terminal device and the plurality of client terminal devices is assigned with a unique one of the plurality of identification numbers, a communication method, comprising:

storing a list including, for each one of the user terminal device and the plurality of client terminal devices, the unique identification number assigned to that terminal device, the addresses of that terminal device, and conditions for connecting that terminal device to the network, the conditions including at least one transmission rate available to that terminal device and a type of peripheral device associated with that terminal device; and receiving a user request to start communication between the user terminal device and a particular one of the plurality of client terminal devices;

selecting from the list, for each one of the user terminal device and the particular client terminal device, the stored unique identification number assigned to that terminal device, the address of that terminal device, and the conditions under which that terminal device may be connected to the network, the conditions including at least one transmission rate available to that terminal device and a type of peripheral device associated with that terminal device;

searching for, from a plurality of stored communication applications, at least one of the plurality of communication applications that is suitable for communication between the user terminal device and the particular terminal device based on the conditions for connecting the user terminal device to the network and the conditions for connecting the particular terminal device to the network;

determining whether the type of peripheral device associated with the user terminal device can communicate with the type of peripheral device associated with the particular terminal device, the type of peripheral device including at least one of a microphone or a camera; and if the at least one suitable communication application is located and the type of peripheral device associated with the user terminal device can communicate with the type of peripheral device associated with the particular terminal device, providing a connection for communication between the user terminal device using its associated peripheral device and the particular terminal device using its associated peripheral device.

11. The communication method according to claim 10, further comprising downloading the list from a communication server machine connected to the network.

12. The communication method according to claim 10, wherein the list is stored in a list storage unit selected from the group consisting of a hard disk drive and a memory card, and the plurality of communication applications are stored in a communication application storage unit selected from the group consisting of a hard disk drive and a memory card.

13. A communication system, comprising:

a plurality of client terminal devices connected to a network and respectively associated with a plurality of identification numbers such that a given one of said plurality of client terminal devices is assigned to a unique one of the plurality of identification numbers; and a communication server machine connected to the network and operable to manage using a database, for each one of said plurality of client terminal devices, the unique identification number assigned to that client terminal device and user information specific to a user of that client terminal device which indicates at least conditions under which that client terminal device may be connected to the network, the conditions including at least one available transmission rate available to that client terminal device and a type of peripheral device associated with that client terminal device, said communication server machine being further operable (i) to receive a request from a first user of a given one of the plurality of client terminal devices to start communication with a second user of another one of said plurality of client terminal devices, (ii) to search the database for first user information specific to the first user using the unique identification number assigned to the given client terminal device, (iii) to search the database for second user information specific to the second user using the unique identification number assigned to the another client terminal device, (iv) to search for at least one communication application suitable for both the given client terminal device and the another client terminal device based on the first user information and the second user information, (v) if the at least one suitable communication application is located, to determine whether the type of peripheral device associated with the given client terminal device can communicate with the type of peripheral device associated with the another client terminal device based on the first user information and the second user information, the type of peripheral device including at least one of a microphone or a camera, and (vi) if the type of peripheral device associated with the given client terminal device can communicate with the type of peripheral device associated with the another client terminal device, to provide a connection for communication between the given client terminal device using its associated peripheral device and the another client terminal device using its associated peripheral device.

14. The communication system according to claim 1, wherein said communication server machine is operable to provide the connection for communication between the first client terminal device and the second client terminal device if the type of peripheral device associated with the first client terminal device is same as the type of peripheral device associated with the second client terminal device.

15. The method according to claim 2, wherein said providing step includes providing the connection for communication between the first client terminal device and the second client terminal device if the type of peripheral device associated with the first client terminal device is same as the type of peripheral device associated with the second client terminal device.

16. The method according to claim 9, wherein said providing step includes providing the connection for communication between the first client terminal device and the second client terminal device if the type of peripheral device associated with the first client terminal device is same as the type of peripheral device associated with the second client terminal device.

17. A computer-readable recording medium having recorded thereon instructions for carrying out a communication method in a communication server machine connected to a network and to a plurality of client terminal devices respectively associated with a plurality of identification numbers such that a given one of the plurality of client terminal devices is assigned to a unique one of the plurality of identification numbers, said communication method comprising:

managing, for each one of the plurality of client terminal devices, the unique identification number assigned to that client terminal device and user information specific to a user of that client terminal device which indicates at least conditions under which that client terminal device may be connected to the network, the conditions including at least one transmission rate available to that client terminal device and a type of peripheral device associated with that client terminal device; and in response to a user of a first one of said plurality of client terminal devices requesting communication using a selected communication application with a user of a second one of said plurality of client terminal devices, determining whether the selected communication application is suitable for communication between the first client terminal device and the second client terminal device based on first user information specific to the user of the first client terminal device and second user information specific to the user of the second client terminal device, if the selected communication application is suitable, determining whether the type of peripheral device associated with the first client terminal device can communicate with the type of peripheral device associated with the second client terminal device based on the first user information and the second user information, the type of peripheral device including at least one of a microphone or a camera, and if the type of peripheral device associated with the first client terminal device can communicate with the type of peripheral device associated with the second client terminal device, providing a connection for communication between the first client terminal device using its associated peripheral device and the second client terminal device using its associated peripheral device.

18. A computer-readable recording medium having recorded thereon instructions for carrying out a communication method in a user terminal device connected over a network to a plurality of client terminal devices, each one of the user terminal device and the plurality of client terminal devices being respectively associated with a plurality of identification numbers such that a given one of the user terminal device and the plurality of client terminal devices is assigned with a unique one of the plurality of identification numbers, said communication method comprising:

storing a list including, for each one of the user terminal device and the plurality of client terminal devices, the unique identification number assigned to that terminal device, the addresses of that terminal device, and conditions under which that terminal device may be connected to the network, the conditions including at least one transmission rate available to that terminal device and a type of peripheral device associated with that terminal device; and in response to a user of said user terminal device requesting communication with a user of a particular one of said plurality of client terminal devices, locating, from a plurality of stored communication applications, at least one of the plurality of communication applications that is suitable for communication between said user terminal device and the requested terminal device based on the conditions for connecting the user terminal device to the network and the conditions for connecting the requested terminal device to the network, determining whether the type of peripheral device associated with said user terminal device can communicate with the type of peripheral device associated with the requested terminal device, the type of peripheral device including at least one of a microphone or a camera; and if the at least one suitable communication application is located and the type of peripheral device associated with said user terminal device can communicate with the type of peripheral device associated with the requested terminal device, providing a connection for communication between the user terminal device using its associated peripheral device and the particular requested terminal device using its associated peripheral device.

19. A computer-readable recording medium having recorded thereon instructions for carrying out a communication method in a communication server machine connected to a network and to a plurality of client terminal devices respectively associated with a plurality of identification numbers such that a given one of the plurality of client terminal devices is assigned to a unique one of the plurality of identification numbers, said communication method comprising:

receiving a request from a first user of a given one of the plurality of client terminal devices to start communication with a second user of another one of said plurality of client terminal devices;

searching a database for first user information specific to the first user using the unique identification number assigned to the given client terminal device, the first user information including at least conditions under which the given client terminal device may be connected to the network, the conditions including at least one transmission rate available to the given client terminal device and a type of peripheral device associated with the given client terminal device;

searching the database for second user information specific to the second user using the unique identification number assigned to the second client terminal device, the second user information including at least conditions under which the another client terminal device may be connected to the network, the conditions including at least one transmission rate available to the another client terminal device and a type of peripheral device associated with the another client terminal device;

searching for at least one of a plurality of communication applications that is suitable for both the given client terminal device and the another client terminal device based on the first user information and the second user information;

if the at least one suitable communication application is located, determining whether the type of peripheral device associated with the given client terminal device can communicate with the type of peripheral device associated with the another client terminal device based on the first user information and the second user information, the type of peripheral device including at least one of a microphone or a camera; and if the type of peripheral device associated with the given client terminal device can communicate with the type of peripheral device associated with the another client terminal device, providing a connection for communication between the given client terminal device using its associated peripheral device and the another client terminal device using its associated peripheral device.

20. A computer-readable recording medium having recorded thereon instructions for carrying out a communication method in a user terminal device connected over a network to a plurality of client terminal devices, each one of the user terminal device and the plurality of client terminal devices being respectively associated with a plurality of identification numbers such that a given one of the terminal device and the plurality of client terminal devices is assigned with a unique one of the plurality of identification numbers, said communication method comprising:

storing a list including, for each one of the user terminal device and the plurality of client terminal devices, the unique identification number assigned to that terminal device, the addresses of that terminal device, and conditions for connecting that terminal device to the network, the conditions including at least one transmission rate available to that terminal device and a type of peripheral device associated with that terminal device; and receiving a user request to start communication between the user terminal device and a particular one of the plurality of client terminal devices;

selecting from the list, for each one of the user terminal device and the particular client terminal device, the stored unique identification number assigned to that terminal device, the address of that terminal device, and the conditions under which that terminal device may be connected to the network, the conditions including at least one transmission rate available to that terminal device and a type of peripheral device associated with that terminal device;

searching for, from a plurality of stored communication applications, at least one of the plurality of communication applications that is suitable for communication between the user terminal device and the particular terminal device based on the conditions for connecting the user terminal device to the network and the conditions for connecting the particular terminal device to the network;

determining whether the type of peripheral device associated with the user terminal device can communicate with the type of peripheral device associated with the particular terminal device, the type of peripheral device including at least one of a microphone or a camera; and if the at least one suitable communication application is located and the type of peripheral device associated with the user terminal device can communicate with the type of peripheral device associated with the particular terminal device, providing a connection for communication between the user terminal device using its associated peripheral device and the particular terminal device using its associated peripheral device.

* * * * *